(12) United States Patent
Sukegawa

(10) Patent No.: US 7,159,079 B2
(45) Date of Patent: Jan. 2, 2007

(54) MULTIPROCESSOR SYSTEM

(75) Inventor: Naonobu Sukegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 10/886,036

(22) Filed: Jul. 8, 2004

(65) Prior Publication Data

US 2005/0102477 A1 May 12, 2005

(30) Foreign Application Priority Data

Nov. 10, 2003 (JP) ............................. 2003-379294

(51) Int. Cl.
 *G06F 13/00* (2006.01)
(52) U.S. Cl. ...................... 711/146; 711/141; 711/142; 711/143
(58) Field of Classification Search ................. 711/146
See application file for complete search history.

(56) References Cited

U.S. PATENT DOCUMENTS 6,088,770 A 7/2000 Tarui et al.

OTHER PUBLICATIONS

Daniel Lenoski et al., "The Stanford Dash Multiprocessor", Mar. 1992 IEEE, pp. 63-79.

*Primary Examiner*—Sanjiv Shah
*Assistant Examiner*—Jae Un Yu
(74) *Attorney, Agent, or Firm*—Reed Smith LLP; Stanley P. Fisher, Esq.; Juan Carlos A. Marquez, Esq.

(57) ABSTRACT

A splittable/connectible bus 140 and a network 1000 for transmitting coherence transactions between CPUs are provided between the CPUs, and a directory 160 and a group setup register 170 for storing bus-splitting information are provided in a directory control circuit 150 that controls cache invalidation. The bus is dynamically set to a split or connected state to fit a particular execution form of a job, and the directory control circuit uses the directory in order to manage all inter-CPU coherence control sequences in response to the above setting, while at the same time, in accordance with information of the group setup register, omitting dynamically bus-connected CPU-to-CPU cache coherence control, and conducting only bus-split CPU-to-CPU cache coherence control through the network.

Thus, decreases in performance scalability due to an inter-CPU coherence-processing overhead are relieved in a system having multiple CPUs and guaranteeing inter-CPU cache coherence by use of hardware.

8 Claims, 9 Drawing Sheets

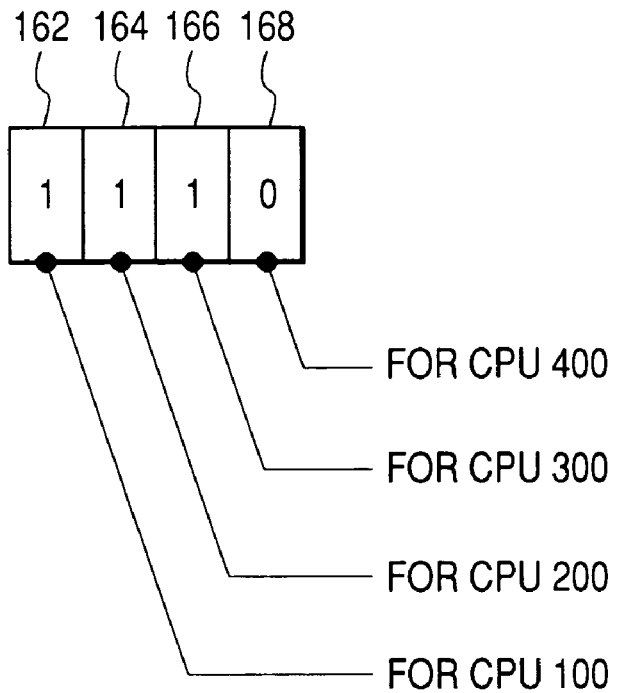
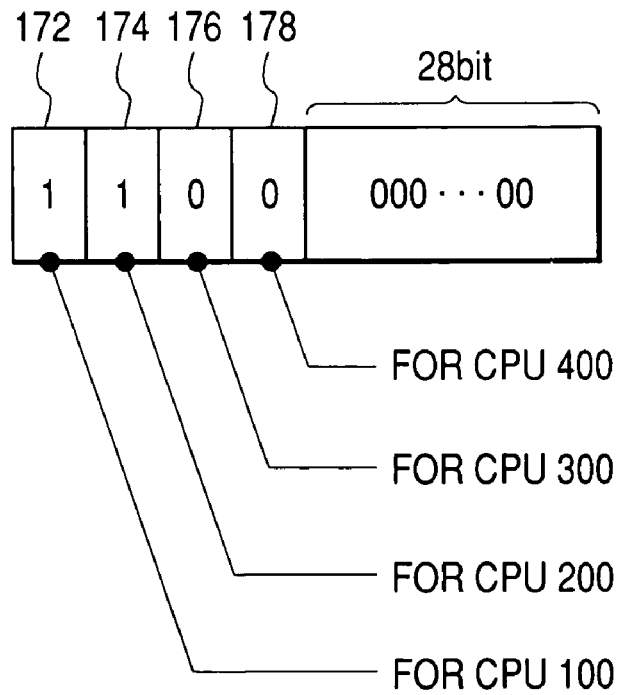

MULTIPROCESSOR SYSTEM

CLAIMS OF PRIORITY

The present application claims prority from Japanese application JP 2003-379294 filed on Nov. 10, 2003, the content of which is hereby incorporated by reference into this application.

FIELD OF THE INVENTION

The present invention relates to inter-CPU coherence control of cache memories in a shared-memory-type parallel computer having multiple CPUs and sharing a main storage between the CPUs. More particularly, the invention relates to an inter-CPU cache coherence control scheme.

BACKGROUND OF THE INVENTION

Thanks to the progress of device technology, the operating frequencies of CPUs are rapidly improving. Meanwhile, the improvement of the memory access latency during access from a CPU to a main storage is slow when viewed in terms of absolute time. This is because the memory access latency is restricted by the physical distance from the CPU to the main storage and by the characteristics of the main storage element. This means that the access latency time is prolonging when viewed in terms of the unit operation time (=1 second/operating frequency) of the CPU. In this context, the access latency tends to become a bottleneck in performance improvement.

The means of compensating for such a relative decrease in performance due to the deterioration of the memory access latency is the cache memory. The cache memory is a means of reducing effective memory access latency by providing a high-speed small-capacity buffer in a position close to a CPU and registering copies of data high in the frequency of use.

Modern computer systems usually employ either a shared-memory-type parallel computer arrangement with multiple CPUs in each of which is mounted the above-mentioned cache memory and among all or some of which is shared the main storage, or a clustered arrangement with shared-memory-type parallel computers. Multiple CPUs are mounted for two purposes: (1) performance improvement, and (2) availability improvement (this prevents the system itself from failing, even if a failure occurs in one CPU). It is essential that a computer called the "server" in computer services should take a shared-memory-type parallel computer arrangement with not less than two CPUs.

When multiple CPUs each having a cache memory share a main storage in this way, coherence control of the cache memories, so-called cache coherence control, becomes a problem. More specifically, when data registered in the cache memory of a CPU (A) is updated with a "store" instruction by another CPU (B), the update results need to be incorporated into the cache memory of CPU (A). In other words, data within the cache memory needs to be updated or nullified.

Such cache memory coherence control is typically conducted through a bus. This is realized by combining a mechanism in which data updates by a processor are broadcast to all CPUs through a bus, and a mechanism in which each CPU snoops through and checks the bus at all times and incorporates broadcast update information into the data registered in the cache memory.

During the above-mentioned cache coherence control using a bus, cache coherence control requests are likely to become congested on the bus. Therefore, if a large-scale shared-memory-type multiprocessor arrangement with a number of CPUs is realized only by bus connection, each CPU will decrease in performance. With respect to this problem, the frequency of occurrence of congestion can be reduced in comparison with that of the bus scheme. This can be achieved by providing, in internal data of each cache memory, a directory for memorizing which processor has registered data in the cache memory, and transmitting a cache coherence request only to necessary processors in accordance with the information registered in the directory. This scheme is employed in so-called NUMA (Non-Uniform Memory Architecture) multiprocessors. For NUMA-type multiprocessors, reference should be made to "The Stanford Dash Multiprocessor", IEEE Computer, Vol. 25, No. 3, pp. 63–79 (March 1992), written by Lenoski, D. et al.

Since it is free of a section on which requests from all CPUs concentrate, such as an inter-CPU bus, the NUMA type has the advantage that performance can be enhanced scalably with increases in the number of CPUs. However, in bus-type multiprocessors, coherence control is executed with low latency immediately after a request has been sent to the bus. NUMA uses a procedure in which, once a coherence control request has occurred, it is first routed through a circuit for judging whether coherence control is to be performed on other CPUs, and then transferred from this circuit to the intended CPU. In general, NUMA has the disadvantage that since the delay time in coherence control is long, small-scale systems are inferior to bus-type multiprocessors in terms of performance.

U.S. Pat. No. 6,088,770 discloses a technology for constructing a system in which multiprocessors of the bus type are connected in a NUMA format with each such multiprocessor as a unit. Also, U.S. Pat. No. 6,088,770 discloses a technology that allows NUMA control to be reduced when a NUMA system is split into partitions. More specifically, a coherence control overhead can be reduced as follow. A main storage is split into the areas to be used only within partitions, and the areas to be used both within and between partitions. Then, the bus-type multiprocessors located within these partitions are broadcast for access to the areas to be used within partitions. Such broadcasting is referred to as multicasting. For example, if the two types of partitions are set only for one range in which the CPUs are connected via the bus, operations on the areas to be used only within partitions will be processed at high speed by the bus, and operations on the areas to be used both within and between partitions will be controlled by NUMA. Therefore, scalability and high-speed processing will be achievable at the same time.

In an actual system, for the partitions and other elements defined in U.S. Pat. No. 6,088,770, there can occur a request for dynamic setting for a purpose of, for example, modifying the elements for each program or modifying them for the migration of an arithmetic process during program execution. However, technical information on dynamic modification of the partitions is not disclosed in U.S. Pat. No. 6,088,770.

The present invention is intended to realize a multiprocessor system that allows dynamic setting of partitions and simultaneous achievement of bus-type high-speed processing and NUMA scalability.

SUMMARY OF THE INVENTION

Multiple CPUs are connected to one another both by bus connection using a splittable bus, and by network connection that realizes NUMA. Bus-based coherence control is executed in the range where the CPUs are connected without bus splitting. Irrespective of the form of the bus connection, all CPU access is registered in a NUMA directory. A group setup register for storing the split state of the bus is provided in a NUMA directory control circuit. Since coherence control between the bus-connected CPUs is realized by using a separate bus, control is conducted that omits a directory-based coherence control request. Coherence control between the CPUs at which the bus is split is conducted in a directory-based coherence control fashion through a network.

When the splitting form of the bus is changed to fit the execution form of a job, the group setup register is also changed at the same time. Thus, between the CPUs where the bus is newly split, coherence control that has been realized with the bus until that time is switched to directory-based coherence control. Conversely, between the CPUs to which the bus is newly connected, coherence control that has been realized with the directory until that time is switched to bus-based coherence control.

A multiprocessor system that allows dynamic setting of partitions and simultaneous achievement of bus-type high-speed processing and NUMA scalability can be realized by the present invention.

BRIEF DESCRIPTION OF THE DRAWINGS

FIG. 5 is a diagram showing entries of a directory in the above embodiment;

FIG. 6 is a diagram showing a group setup register in the above embodiment;

DETAILED DESCRIPTION OF THE PREFERRED EMBODIMENTS

Embodiment 1

The operation of a multiprocessor system according to the present invention is outlined below first, and then the operation of this multiprocessor system is detailed below in the following order:
(1) Coherence control through a bus
(2) Coherence control through a NUMA network
(3) Bus connecting change process

[Operational Outline]

Figure 1:
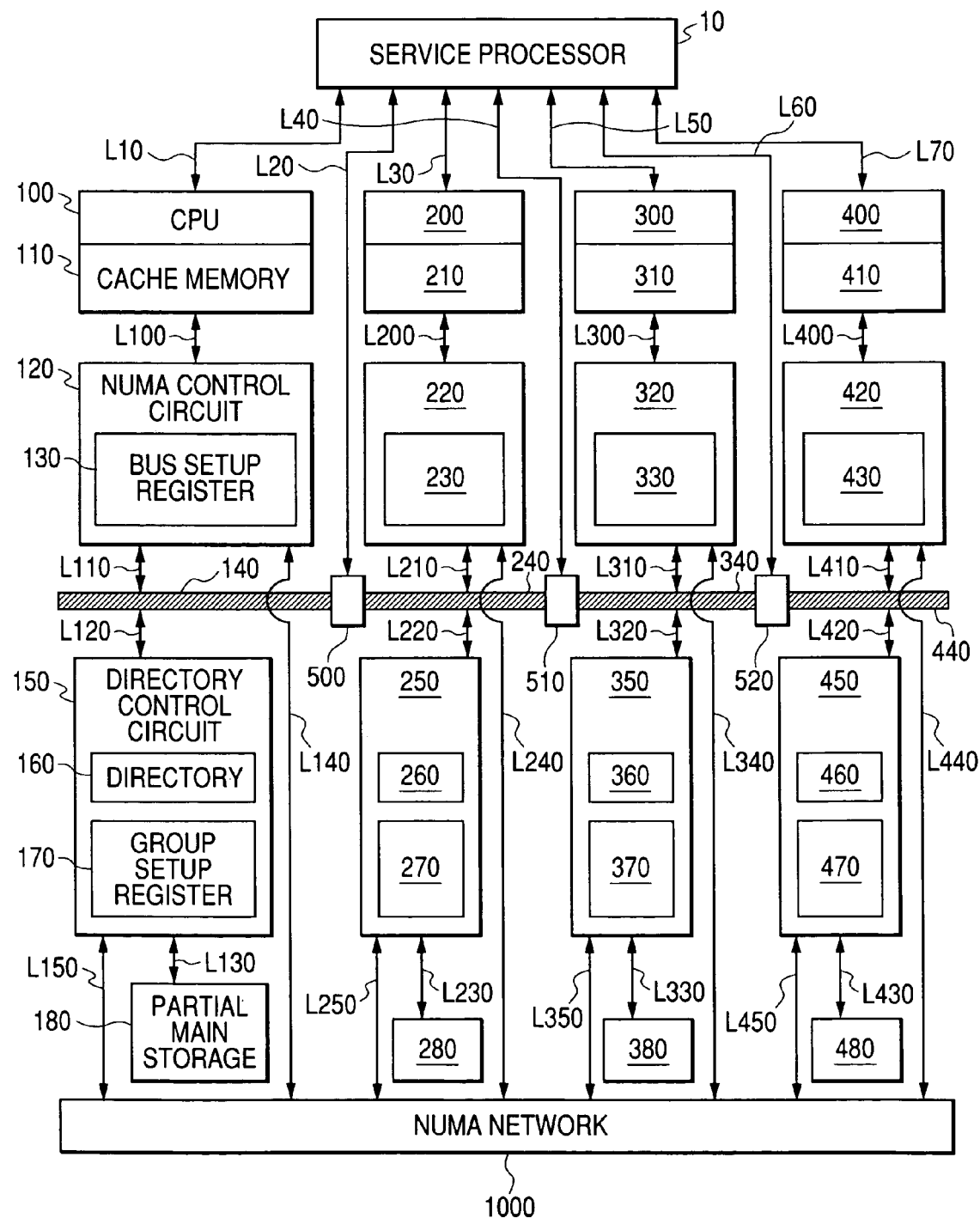
FIG. 1 is a block diagram showing the total configuration of a parallel computer according to Embodiment 1 of the present invention.

Using FIG. 1, this section outlines the operation of the multiprocessor system according to the present invention. The description below assumes that bus splitting/connecting circuits 500, 510, and 520 are initially set so that the circuits 500 and 520 are in a connected state and, the circuit 510, in a split state. In other words, it is to be assumed that although CPUs 100 and 200 are bus-connected and CPUs 300 and 400 are also bus-connected, the two sets of CPUs themselves are isolated from each other.

In this state, a cache coherence request issued from, for example, the CPU 100 can be transmitted to the CPU 200 through a partial bus 140, the bus splitting/connecting circuit 500, and a partial bus 240, in that order. Meanwhile, since the bus splitting/connecting circuit 510 is in a split state, a cache coherence request issued from the CPU 100 is not transmitted to the CPU 300 through any bus.

Independently of bus-based coherence control, directory-based coherence control is executed. A cache coherence request from the CPU 100 to the CPU 300 can be executed, provided that the request is transmitted through a NUMA network.

The following coherence control sequences are performed utilizing the mechanisms outlined above:
(A) Cache coherence control using only the bus is conducted, provided that the CPUs are bus-connected and an address of the data to be subjected to cache coherence control is with respect to a partial main storage existing within a bus-connected range.
(B) Cache coherence control using the NUMA network is conducted in cases other than (A) above.

Actual examples are shown below. For example, in cache coherence control relating to a request issued from the CPU 100, if the intended address is with respect to a partial main storage 180, the cache coherence request is transmitted to the partial bus 140, the bus splitting/connecting circuit 500, and the partial bus 240, in that order.

In response to this request, if a directory control circuit 150 can judge, from the information registered in the directory 160, that cache coherence control needs to be performed only on the CPU 200 connected by the bus, the control circuit 150 then judges all coherence control sequences to being conducted through the bus. The directory control circuit 150 stores access information to the partial main storage 180 into a directory 160. Consequently, cache coherence control through a NUMA network 1000 is unexecuted. If cache coherence control is also judged necessary for the CPUs 300 and 400 not connected by the bus, cache coherence control is executed through the NUMA network. The split/connected state of the bus is stored within a group setup register 170 by the directory control circuit 150. Not only access information of the CPUs 300 and 400 not connected by the bus, but also information of the CPU 200 connected by the bus are stored within the directory 160. When access to a partial main storage 280 is considered, since, to the CPU 100, the partial main storage 280 is also an element accessible through the bus, operation similar to that relating to the partial main storage 180 (and the directory control circuit 150) is basically executed for the partial main storage 280 (and a directory control circuit 250).

Regarding the above operation, for example, in cache coherence control relating to a request issued from the CPU 100, if the intended address is with respect to a partial main storage 380, the NUMA control circuit 120 judges that the request is for the partial main storage 380 not connected by the bus. Consequently, the cache coherence request is transmitted to a directory control circuit 350 through a NUMA network 1000. The directory control circuit 350 executes cache coherence control through normal NUMA, based on the information registered in a directory 360.

Details of the cache coherence control operation will be described in separate detailed description of the operation.

A method of steady cache coherence control during bus splitting setup has been outlined above. Next, the outline of operation for changing the bus splitting setup is described below. The description here applies when the bus splitting/connecting circuit 500 changes from the connected state to a split state.

As previously mentioned, access information of the CPU 200 is also originally registered in the directory 160. Therefore, the directory control circuit 150 can also execute cache coherence control through the NUMA network, with respect to the CPU 200, merely by changing the group setup register 170. Hence, when changing the bus splitting setup, the directory control circuit 150 changes a setting of the bus splitting/connecting circuit 500. Simultaneously, the directory control circuit 150 modifies settings of bus setup registers 130, 230, 330, and 430 included in NUMA control circuits 120, 220, 320, and 420, respectively, and settings of group setup registers 170, 270, 370, and 470 included in directory control circuits 150, 250, 350, and 450, respectively. After these changes/modifications, requests only to the CPU 200 in the bus-based coherence relating to the partial storage 180 from the CPU 100 are executed for the CPU 200 from the directory control circuit 150 through the NUMA network 1000. In addition, coherence control relating to the main storage 280 is executed on a directory-260 basis by the NUMA control circuit 120 through the NUMA network 1000, not using the bus.

The change of the operation in which the setting of the bus is changed from the connected state to the split state has been described above. However, conversely, when the split state is changed to the connected state, the basic operation is also the same as for the above. That is, when the settings of the bus splitting/connecting circuits 500, 510, and 520 are modified, the settings of the bus setup registers 130, 230, 330, and 430 included in the NUMA control circuits 120, 220, 320, and 420, respectively, and the settings of the group setup registers 170, 270, 370, and 470 included in the directory control circuits 150, 250, 350, and 450, respectively, are also modified simultaneously. Consequently, in the range where the cache coherence control operation that has heretofore been executed through the NUMA network 1000, the network-based operation is changed to bus-based operation. Details of the changing procedure will be mentioned in separate detailed description of operation.

The operational outline of the system according to the present invention has been described above. Next, the operation of this system, inclusive of its constituting elements, is described in detail below.

[Details of Operation]

Before going into details of operation, this section describes a cache coherence protocol presupposed in the present invention. The invention assumes that cache coherence control of each CPU obeys the MESI protocol. In the MESI protocol, the rule exists that one CPU in an "Exclusive" (E) status or multiple CPUs in a "Shared" (S) status should be able to possess "Clean" data (data matching in contents between the cache memory and the main storage). However, only one CPU in a "Modified (M) status should be able to possess "Modified" data (data mismatching in contents between the cache memory and the main storage due to the fact that although the latest data by update operations are present in the cache memory, only the old data existing before the updates is present in the main storage). Hence, after the CPU in status S has updated data, a cache invalidation request is issued to all other CPUs and only the CPU that has performed the update operation possesses new data in status M in cache memory. When data in status M is accessed from any other CPU, the data is written from the cache memory back into the main storage and multiple CPUs come to possess "Clean" data in status S in the respective cache memories.

At least the following types of transactions are required in the MESI protocol (transaction: data manipulation request from the CPU):

Fetch request (for new registration in the cache)

Cache invalidation request (for cache data update operations)

Cast-out request (for write-back from the cache to the memory)

The present invention also assumes that the above three requests stem from the CPU.

Figure 7:
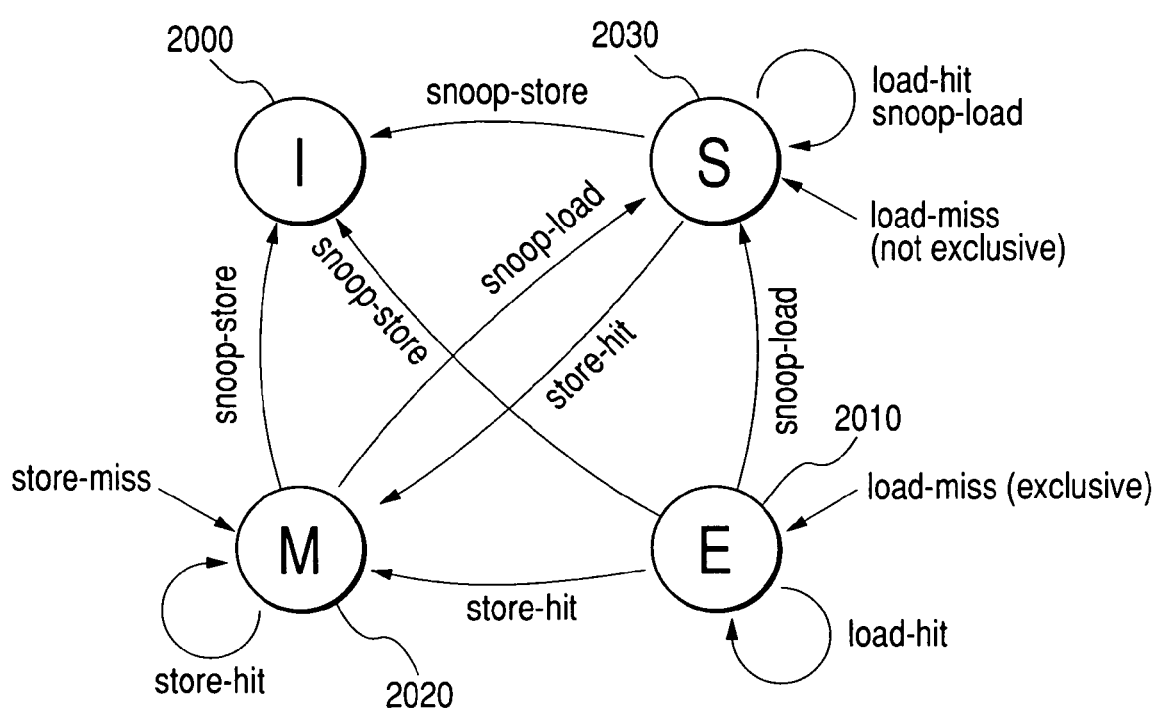
FIG. 7 is a diagram showing changes in the state of a cache memory in the above embodiment.

Status I (2000) in FIG. 7 indicates an "Invalid" status (the data in the cache is in an invalid state). Similarly, status E (2010) indicates the "Exclusive" status described above, and status S (2030) the "Shared" status described above, and status M the "Modified" status described above. Also, "load-miss (exclusive)" indicates that as a result of a fetch request, no other CPUs are found to have registered data in their cache memories. In addition, "load-miss (not exclusive)" indicates that as a result of a fetch request, other CPUs are also found to have registered data in their cache memories. Furthermore, "store-miss" indicates that since a cache miss occurred following issuance of a "store" instruction, a fetch request for data registration in the cache memory has been issued and then after execution of the fetch, a cache invalidation request has been issued in order to execute the "store" instruction.

Besides, "load-hit" and "store-hit" indicate that execution of a "load" instruction and a "store" instruction has resulted in the cache memory being hit. In this case, if "store-hit" occurs in status S, a cache invalidation request also needs to be transmitted to make the cache memories of other CPUs invalid.

Furthermore, "snoop-load" indicates that a fetch request has been received from any other CPU, and "snoop-store" indicates that a cache invalidation request has been received from any other CPU. On receipt of "snoop-load" in status M, cast-out for writing data back into the main storage needs to be executed.

Based on the above cache coherence control protocol, description of the steady cache coherence control operation with bus splitting/connecting setup being unchanged is given in the following first two sections independently for bus-based control and network-based control each, and the control operation applied when bus splitting/connecting setup is changed is described in the last section.

(1) Coherence Control Through the Bus

As described in the above operational outline, coherence control through the bus is executed between bus-connected CPUs when the address of the data to be subjected to cache coherence control is with respect to the partial main storages existing within the bus-connected range. A fetch request process, a cache invalidation request process, and a cast-out request process through the bus are described in that order below.

(1)-1: Fetch Request

Based on the assumption that the bus splitting/connecting circuits 500, 510, and 520 are set to be connected, split, and connected states, respectively, this section describes how a fetch request from the CPU 100 to the partial main storages 180 and 280 is controlled between the CPUs 100 and 200.

If the cache memory 110 makes a mistake in operation based on a "load" instruction or a "store" instruction, the CPU 100 outputs a fetch request packet through a signal line L100. The output operation assumes that the address at this time is with respect to a request issued to the partial main storage 180 first.

Figure 8:
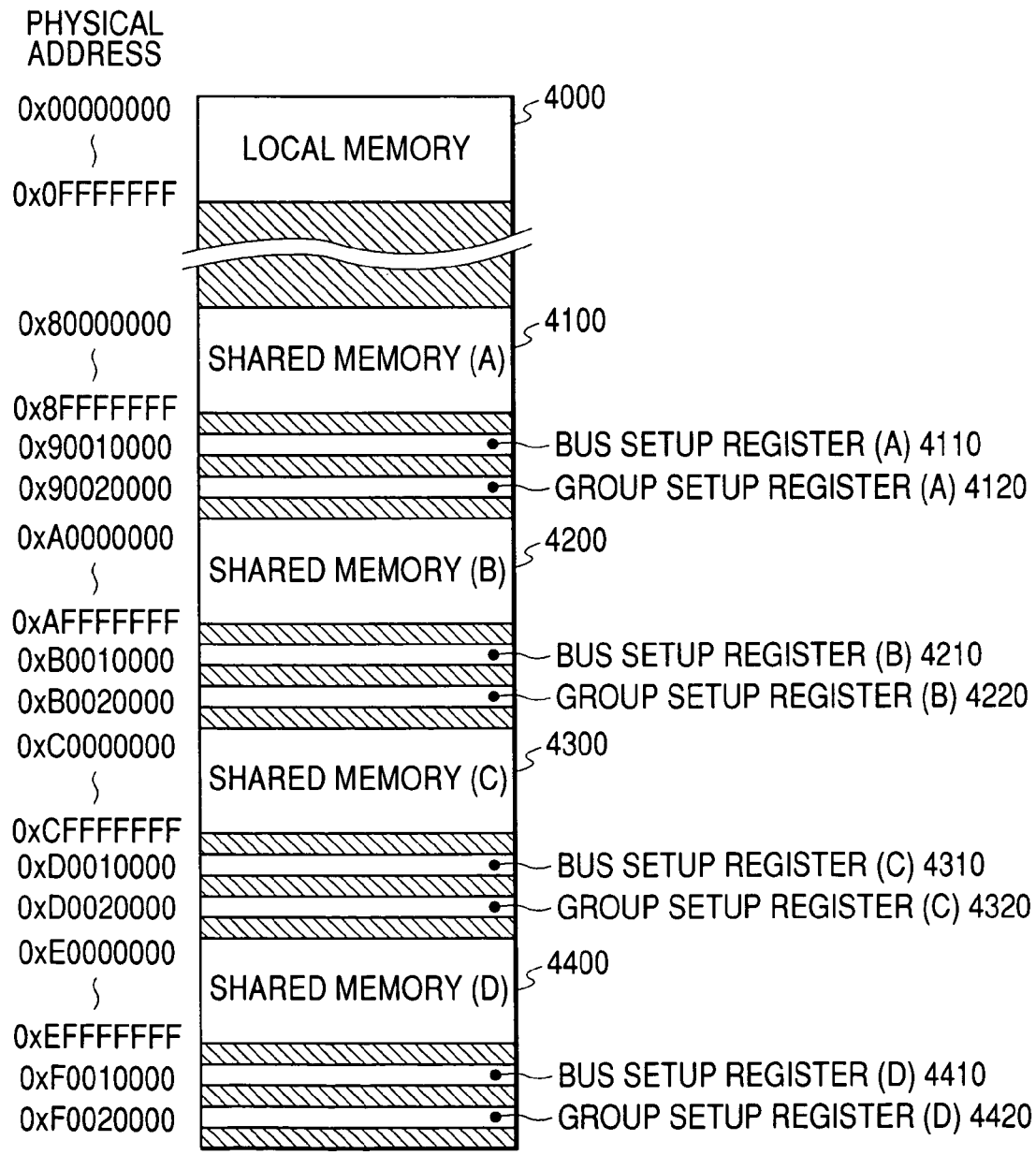
FIG. 8 is a diagram showing an address map of the parallel computer in the above embodiment.

An address map in the present embodiment is shown in FIG. 8. Half of each of the partial main storages 180, 280, 380, and 480 serves as a local memory. That is, a special local area for the CPU 100 is reserved for the partial main storage 180, and a special local area for the CPU 200 is reserved for the partial main storage 280. Likewise, a special local area for the CPU 300 is reserved for the partial main storage 380, and a special local area for the CPU 400, for the partial main storage 480. FIG. 8 assumes that each partial main storage has a capacity of 512 megabytes. In FIG. 8, the remaining half of the partial main storage 180, exclusive of its local memory, is shown as a shared memory (A) 4100, and the remaining half of the partial main storage 280, exclusive of its local memory, as a shared memory (B) 4200. Similarly, the remaining half of the partial main storage 380, exclusive of its local memory, is shown as a shared memory (C) 4300, and the remaining half of the partial main storage 480, exclusive of its local memory, as a shared memory (D) 4400. Hence, when viewed from the CPU 100, access to a local memory 4000 is access to the partial main storage 180, access to shared memory (A) 4100 is also access to the partial main storage 180, and access to shared memory (B) 4200 is access to the partial main storage 280.

Figure 9:
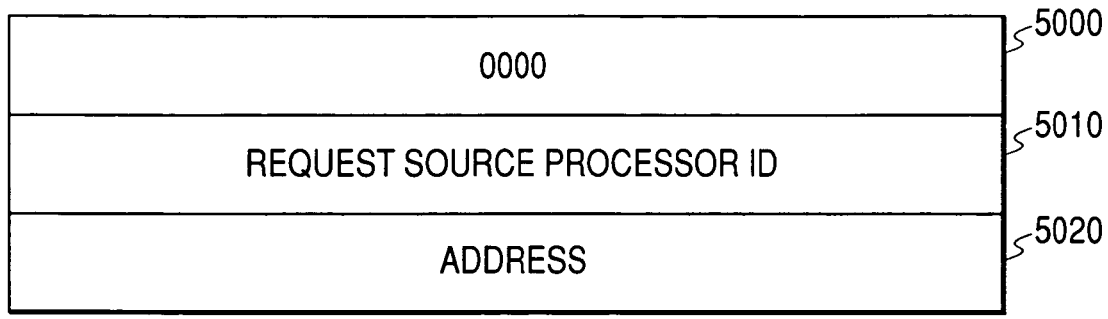
FIG. 9 is a diagram showing a fetch request packet in the above embodiment.

A fetch request packet format is shown in FIG. 9. Shown in the top of FIG. 9 is a command 5000, with its contents "0000" denoting a fetch request. A request source processor ID 5010 takes a value of, for example, either "0000" in the event of a cache miss by the CPU 100, "0001" in the event of a cache miss by the CPU 200, "0010" in the event of a cache miss by the CPU 300, or "0011" in the event of a cache miss by the CPU 400. An address 5020 denotes a fetching address.

Figure 2:
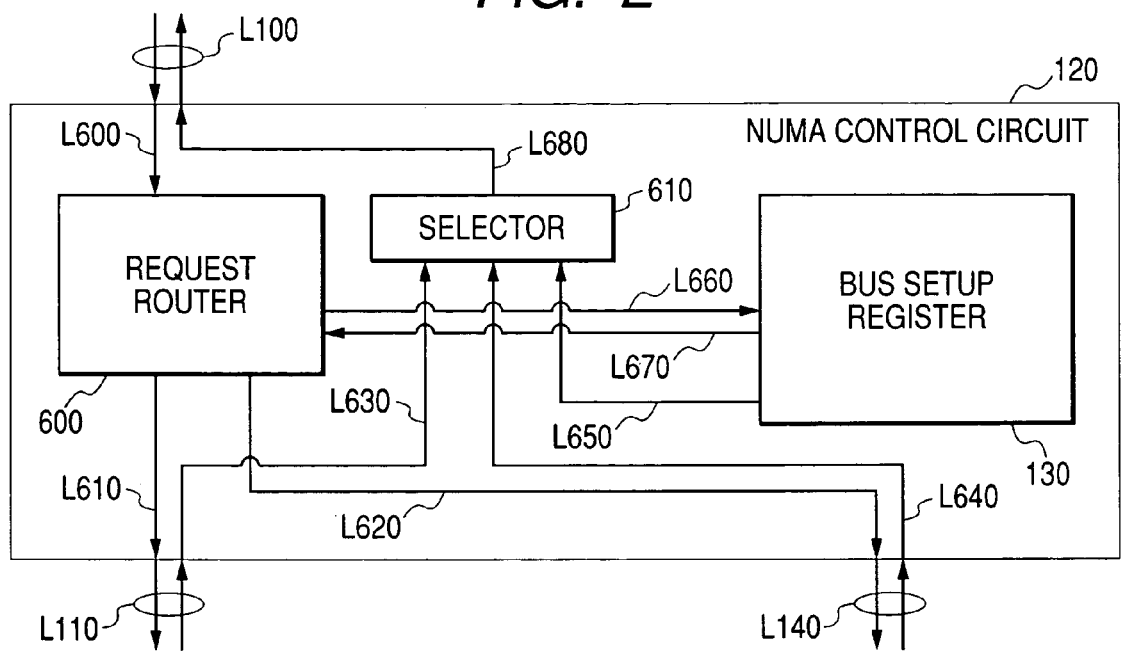
FIG. 2 is a block diagram showing a NUMA control circuit in the above embodiment.
Figure 3:
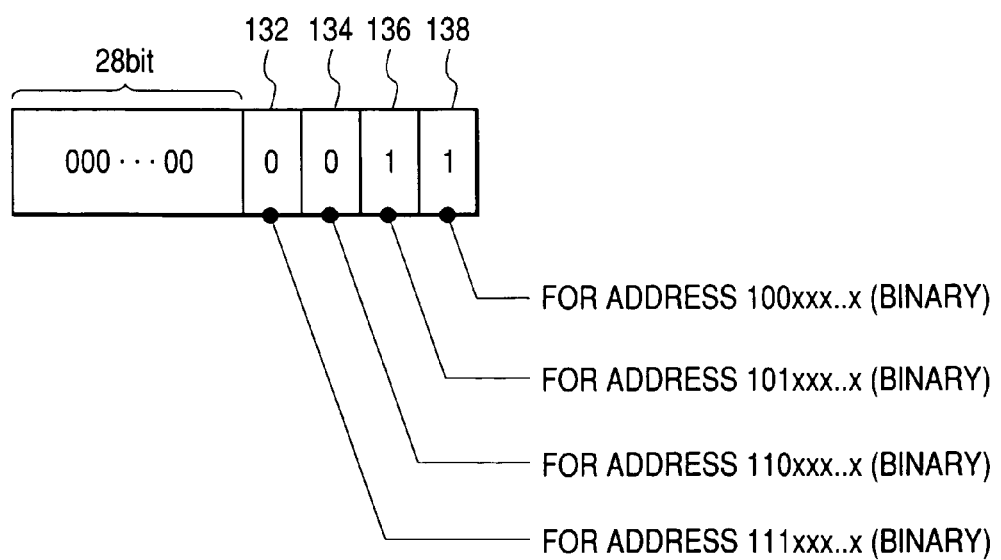
FIG. 3 is a diagram showing a bus setup register in the above embodiment.

Description is now returned to the original topic. Suppose that in response to the address, a fetch request packet is output from the CPU 100 to the signal line L100. As can be seen from FIG. 2 showing contents of the NUMA control circuit 120, after reaching a request router 600, the fetch request has its destination determined by being checked against the data setting of the bus setup register 130. Contents (32 bits) of the bus setup register 130 are shown in FIG. 3. In the bus setup register 130, low-order four bits (in the figure, bits 132, 134, 136, 138) indicate whether, when viewed from the NUMA control circuit, shared memories (A) 4100 to (D) 4400 are each connected through the bus or (if the bus is set to a split state) inaccessible through the bus. The least significant bit 138 is for shared memory (A) 4100, the bit 136 for shared memory (B) 4200, the 134 for shared memory (C) 4300, the bit 132 for shared memory (D) 4400. If "1" is set up at the bit position, this indicates that the memory is bus-connected. If "0" is set up, this indicates that the bus is split. The above data settings are transmitted from the bus setup register 130 through a signal line 670 to the router. Therefore, the router judges that the current packet is a request to the partial main storage 180 and outputs the request to the partial bus 140 through signal lines L610 and L110.

Since the bus splitting/connecting circuit 500 is in a connected state as previously mentioned, the above fetch request is also transmitted to the partial bus 240 via the bus splitting/connecting circuit 500. Thus, the NUMA control circuit 220 first snoops for the fetch request through a signal line L210 and then transmits the fetch request to the CPU 200 and its cache memory 210 through a selector 610 of FIG. 2. Shown in FIG. 2 are contents of the NUMA control circuit 120, which has the same internal configuration as that of the NUMA control circuit 220.

If the snooping results here are a miss (i.e., the corresponding data is not registered in the cache memory 210) or memory "Clean" (i.e., the fetch from the memory is permitted since the fact that the memory data is the latest has been guaranteed), the information is replied from the CPU 200 through a signal line L200. The reply signal is transmitted to the partial bus 240 through the internal request router 600 of the NUMA control circuit 220 and the signal line L210. Then, the signal is further sent to the bus splitting/connecting circuit 500, the partial bus 140, and a signal line L120, in that order. Thus, the signal is transmitted to the directory control circuit 150 connected to the partial main storage 180 to which the access is to be made.

Figure 4:
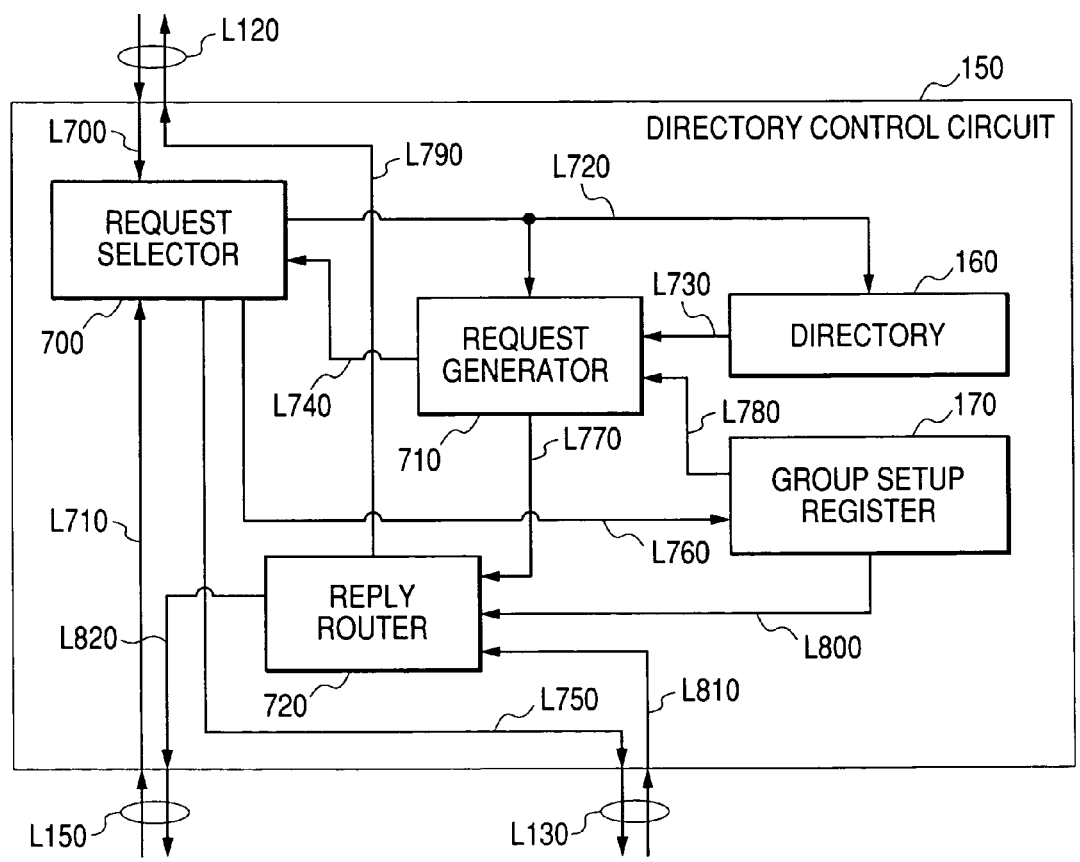
FIG. 4 is a block diagram showing a directory control circuit in the above embodiment.

The interior of the directory control circuit 150 is shown in FIG. 4. Up until the fetch request packet has reached a request selector 700, the packet, on leaving the partial bus 140, originally remains suspended as a request to the partial main storage 180. At the same time the request is thus suspended, the directory 160 is searched for through a signal line L720. The directory 160 provides such an entry as shown in FIG. 5, for each unit of access from the CPUs 100, 200, 300, and 400 to the main storage (the unit of access is referred to typically as a cache block). That is, the entry as shown in FIG. 5 is included in large numbers in the directory 160. In FIG. 5, "1" in a bit 162 indicates that the block has been registered in the cache memory of the CPU 100 in the past and that the block is likely to still remain in the cache memory. More accurately, the block is likely to have already disappeared from the cache memory, but to the directory, the block is supposed to have been registered in the cache memory. Similarly, a bit 164 is for the CPU 200, a bit 166 for the CPU 300, and a bit 168 is for the CPU 400.

In the example of FIG. 5, the main storage is being accessed by the CPUs 100, 200, and 300. However, the case mentioned in this section, assumes a value of "0100", not the above pattern. In other words, this case assumes that for other CPUs, only the CPU 200 is likely to have acquired the above value into the cache. On entry of this signal into a request generator 710 through a signal line L730, the request generator 710 compares this signal with the value of the group setup register 170 that enters through a separate signal line L780, which communicates with the group setup register 170.

Contents of the group setup register 170 are shown in FIG. 6. The group setup register 170 is a 32-bit register, having bits 172, 174, 176, and 178, as four high-order bits, for the CPUs 100, 200, 300, and 400, respectively. A value of "1" is registered if each CPU is bus-connected when viewed from the directory control circuit, or "0" is registered if the bus itself is split.

The request generator 710 can judge, from such information as in FIG. 6, that the CPU 200 that was checked using the directory 160 is bus-connected. In this case, the request selector 700 is notified through a signal line L740 so as to wait for a reply from the CPU 200. If the directory has a value of "0110" and the CPU 300 is also supposed to have registered this value in the cache, the request generator 710 is to conduct, through the signal line L740, the request selector 700, and the signal lines L710 and L150, the cache coherence control operation via the NUMA network 1000. This control operation will be detailed in section (2). This section (1) continues description assuming that the value of the directory is "0100" as previously mentioned.

Figure 11:
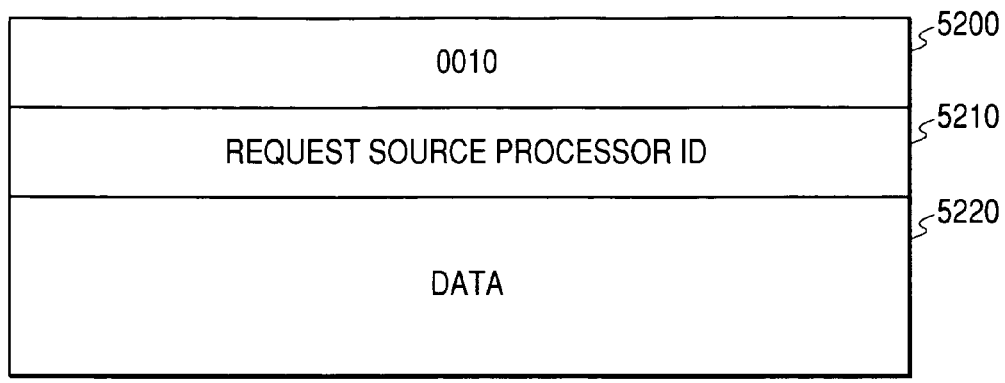
FIG. 11 is a diagram showing a fetch reply packet in the above embodiment.

As previously mentioned, according to the directory 160, the cache block is likely to have been registered in the cache of the CPU 200. However, on confirmation of the fact that a cache miss or memory "Clean" replied from the CPU 200 reaches the request selector 700, a request selector 700 can judge that the partial main storage 180 should be accessible in response to the fetch request. Consequently, the request selector 700 notifies, through the signal line L720, data registration of the CPU 100 in the directory 160 (as a result of the notification, the value of the directory entry is changed from "0100" to "1100"). The request selector 700 also outputs the fetch request to the partial main storage 180 through signal lines L750 and L130. In response to this request, the partial main storage 180 sends the fetch reply packet shown in FIG. 11. The fetch reply packet includes a command 5200 whose value is "0010", a request source processor ID 5210 (=reply-sending destination processor ID), and a data body 5220 (having a size equivalent to one cache block).

This fetch reply packet is output from the signal line L130 to a signal line L810, a reply router 720, and signal lines L790 and L120, and the partial bus 140, in that order (elements L810, 720, L790, and L120 are shown in FIG. 4). The packet is further transferred from the signal line L110 through a signal line L630 (shown in FIG. 2) to the selector 610, from which the reply data is then returned to the cache memory 110 and the CPU 100 via signal lines L680 and L100.

The above applies to the case where the reply of the CPU 200 is a cache miss or memory "Clean" and data is read from the main storage. Described next is a case in which the CPU 200 is in status M shown as 2020 in FIG. 7 (i.e., the latest data exists in the cache memory 210 of the CPU 200) and thus the CPU 100 needs to read out the data registered in the cache memory 210.

Figure 10:
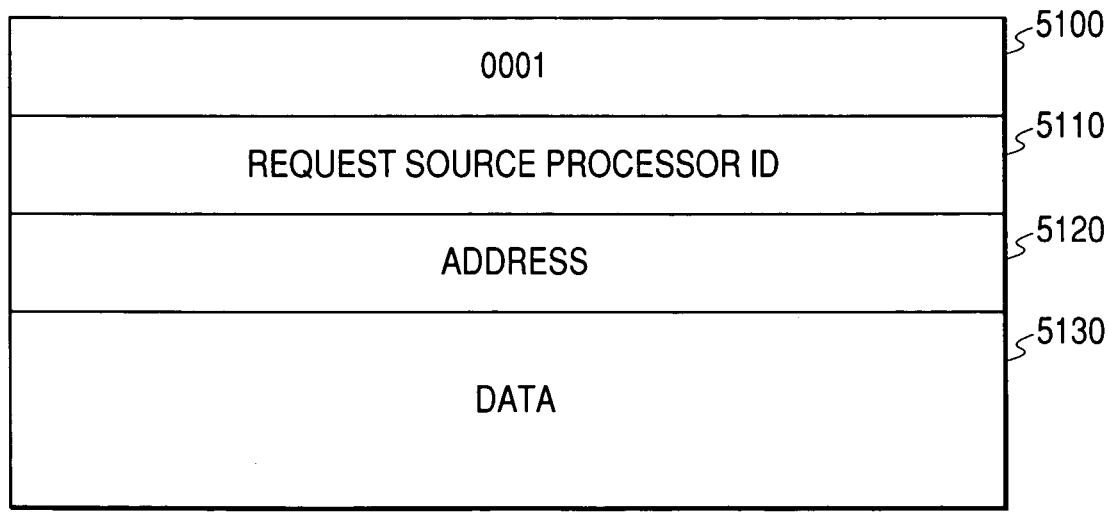
FIG. 10 is a diagram showing a cast-out request packet in the above embodiment.

In this case, a cast-out packet, not a miss or memory "Clean" status, is output from the CPU 200. The cast-out packet is shown in FIG. 10. In addition to a command 5100 having a value of "0001", the packet includes a request source processor ID 5110 (=write source processor ID; in the current case, the CPU 200), an address 5120 to be written back, and a cache block of data 5130.

As with a miss or memory "Clean" status, the cast-out packet, on reaching the request selector 700 of the directory control circuit 150, writes back the data into the partial main storage 180 through the signal lines L750 and L130. The request selector 700 waits for the write-back operation, and what else the selector 700 is to perform is to read the data out from the partial main storage 180, as with a miss or memory "Clean" status. (At this time, the entry of the directory 160 is changed from "0100" to "1100" as previously mentioned.)

Access to the partial main storage 180 is as described above. Access operation with respect to the partial main storage 280 connected through the bus is also basically the same as above, except that instead of the directory control circuit 150, the directory control circuit 250 operates as the principal body in the operation.

(1)-2: Cache Invalidation Request

To execute a "store" instruction on the data that the CPU 100 registered in the cache memory 110 (the data is shared with any other CPU and the cache status is S 2030 shown in FIG. 7), the need arises to cancel the cache memory of the other CPU. This section describes the operation. The description in this section assumes that the cache-registered data is shared between the CPUs 100 and 200 and that the data to be subjected to the cache cancellation is present in the partial main storage 180. That is, the relative value (equivalent to the value in FIG. 5) of the entry within the directory 160 with respect to the data is "1100".

Figure 12:
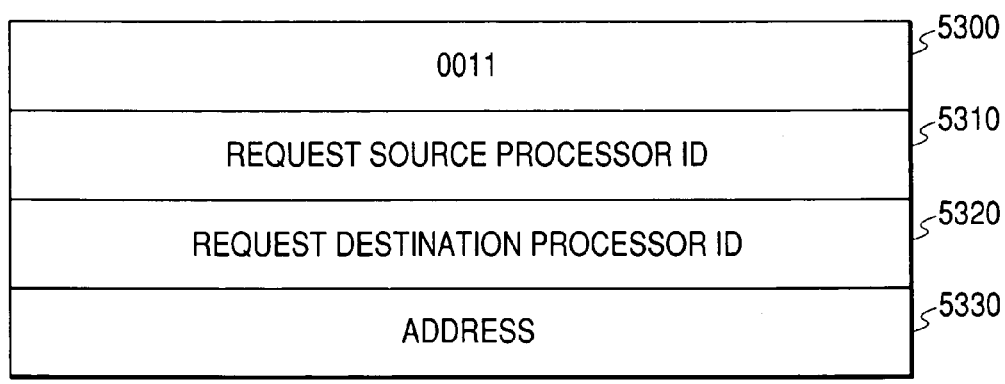
FIG. 12 is a diagram showing a cache invalidation request packet in the above embodiment.

Similarly to the packet described in the previous section, a cache invalidation request packet is first output from the CPU 100 through the signal line L100. The cache invalidation request packet is shown in FIG. 12. A command 5300 denotes a value of "0011", a request source processor ID 5310 identifies, in the current case, the CPU 100, and when the packet is output from the CPU 100, a request destination processor ID 5320 is "Null" (in the current case, a binary number of all 1s). The request source processor ID 5310 is a field to which a meaningful value is assigned during the coherence control conducted through the NUMA network, and the description in this section assumes that "Null" remains assigned. The cache invalidation request packet further has an address 5330 that is to be invalidated.

The cache invalidation request packet is transmitted from the CPU 100 to the CPU 200 and the directory control circuit 150 similarly to the fetch request packet described in the previous section. However, the way the cache invalidation request packet is processed differently in three respects. A first difference is that instead of a cache miss or memory "Clean" status, a cache invalidation successful status is returned as a result of transmission to the CPU 200. A second difference is that even after the status has returned, the directory control circuit does not access the partial main storage 180 and instead, only re-sets the value of the directory 160 (in this example, changes the value from "1100" to "1000"). A third difference is that instead of fetch data, a cache invalidation completion status is returned to the CPU 100.

Both cache invalidation with respect to the data contained in the partial main storage 180, and cache invalidation with respect to the data contained in the partial main storage 280, which is also bus-connected, are basically of the same operation as the cache invalidation operation in the previous section. The only difference is that instead of the directory control circuit 150, the directory control circuit 250 operates as the principal body in the operation.

(1)-3: Cast-Out Request

This section describes the sequence where the need arises for information previously registered in status M 2020 to be written back into the main storage in order to register new other data in the cache memory 110 (this section assumes a write-back request with respect to the partial main storage 180 similarly to each section up to the previous section). The fact that data is possessed in status M 2020 indicates that no other CPUs are likely to have registered the same cache block, and thus the value of the entry within the directory 160 is "1000".

For cast-out, the CPU 100 also outputs a cast-out request packet through the signal line L100 first. The cast-out request packet has exactly the same format as that described in section (1)-1 above using FIG. 1, and in the current pattern, the request source processor ID identifies the CPU 100.

Cast-out is basically an action taken only to write data back into the main storage, and coherence control between CPUs is unnecessary. Therefore, as with the fetch request packet, the cast-out request packet, after reaching the directory control circuit 150, immediately performs the write-back action on the partial main storage 180 without waiting for coherence control of other CPUs. More specifically, the packet immediately performs write-back into the partial main storage 180 through the signal lines L750 and L130 without waiting for completion of coherence control operations at the request selector 700 of FIG. 4.

With regards to the manipulation of the directory 160 in this action, since the execution of cast-out basically causes a cache data block to disappear from the cache memory 110 of the CPU 100, the value of the entry in the directory 160 may be changed from "1000" to "0000". However, when use of a special instruction allows cast-out to be executed without the cache data block disappearing from the cache memory 110, "1000" needs to be maintained as the value of the entry in the directory 160. The present embodiment presupposes the latter, and the directory 1600 is to be unchanged.

Both cast-out with respect to the data contained in the partial main storage 180, and cast-out with respect to the data contained in the partial main storage 280, which is also bus-connected, are basically of the same operation as the operation described in the previous section. The only difference is that instead of the directory control circuit 150, the directory control circuit 250 operates as the principal body in the operation.

An example in which the CPU 100 executes cast-out at its own convenience has been described in this section. Cast-out operation in the bus-connected range in accordance with a fetch request from any other CPU is as described in section (1)-1 above. Cast-out in a bus-split range is described in the following section.

(2) Coherence Control Through the NUMA Network

As mentioned previously, when the intended CPUs are not connected through the bus, or even if they are bus-connected, when the address of the data to be subjected to cache coherence control is not with respect to a partial main storage present within the bus-connected range, the cache coherence control is conducted through the NUMA network 1000.

This section focuses on differentials between cache coherence control through the NUMA network 1000 and the control through the bus.

(2)-1: Fetch Request

This section first describes an example of issuing a fetch request to a non-bus-connected partial main storage via the NUMA network. Formerly, a fetch request packet has been output to a bus via signal lines L610 and L110. In the example here, a fetch request packet is output to the NUMA network 1000 through lines L620 and L140. The request router 600 within the NUMA control circuit 120, 220, 320, or 420 judges, from the relationship between the address of the fetch request and the value of the bus setup register 130, 230, 330, or 430, that the bus is unconnected. On judging from the request destination address 5020 of the packet that the destination is, for example, the partial main storage 380, the NUMA network 1000 transmits the packet to the directory control circuit 350 appropriate for that partial main storage. The basic concept that once the packet has been transmitted to the request router 700 within the directly control circuit, coherence control is conducted using the information of the directly 160, is the same as in Section (1)-1. Since fetch request packets do not enter via the bus, it is necessary that as a result of directory searching, the directory generator 710 should be used to generate all coherence control packets and the NUMA network 1000 should also be used to distribute coherence control packets to the intended processor via the reply router 720 and the signal lines L820 and L150. Distributed packets enter the NUMA control circuits 120, 220, 320, and 420 and are transmitted to the CPUs 100, 200, 300, and 400 via the selector 610. Consequently, for example, even when a CPU having data of status M exists and the need arises for data within the cache memory to be written back into the partial main storage, the data is sent via the NUMA control circuits 120, 220, 320, and 420 and written back through the NUMA network 1000.

In short, when a fetch request is issued to a non-bus-connected partial main storage via the NUMA network, all the operation that has been executed via the bus in the previous section is basically executed via the NUMA network 1000.

The fetch requests transmitted via the NUMA network are all fetch requests with respect to the partial main storages 180, 280, 380, and 480 connected through the bus. However, even when the CPU 100, 200, 300, or 400 is not bus-connected, data may also have been registered in the cache memory 110, 210, 310, or 410 of that CPU according to particular search results on the directory 160, 260, 360, or 460. In that case, when, in Section (1)-1, the directory 160 is searched within the directory control circuit 150 and data registration in the cache memory of the CPU 200 is detected, the following change is added to the operation of the section having suspended fetch request packet. The suspended fetch request packet is processed in the request selector 700 while waiting for cancellation of cache coherence control with respect to the bus-connected CPU 200. That is, when data registration in the cache memory of a non-bus-connected CPU (e.g., the CPU 300) is detected as a result of the search of the directory 160, a fetch request packet is generated by the request generator 710 and then sent to the reply router 720, the signal lines L820 and L150, and the NUMA network 1000. This packet is further transmitted to the CPU 300 via the NUMA control circuit 320. The request is retained in the request selector 700 until a reply from the CPU 300 has been returned again to the directory control circuit 150 via the NUMA control circuit 320 and the NUMA network 1000. As a result of this request, if a cast-out request generates from the CPU 300, the cast-out request is also transmitted to the directory control circuit via the NUMA control circuit 320 and the NUMA network 1000. After that, associated data is written back into the partial main storage 180 before the directory control circuit 150 performs the fetch operation.

With regards to the settings of the directories 160, 260, 360, and 460, data within the CPU that has newly performed the fetch operation is newly registered in the associated directory similarly to Section (1) above.

(2)-2: Cache Invalidation Request

Figure 13:
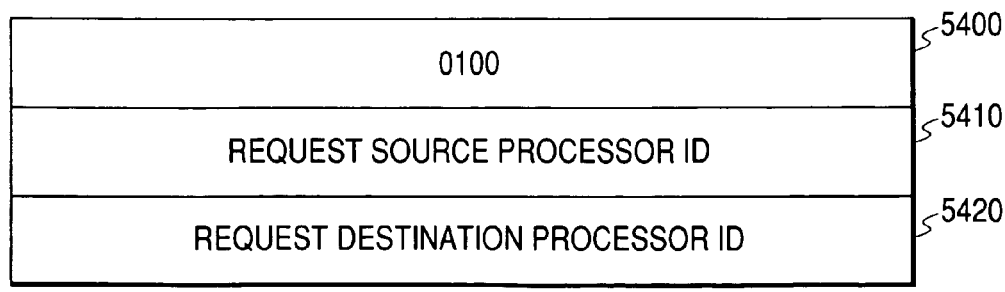
FIG. 13 is a diagram showing a cache invalidation reporting packet in the above embodiment.

Similarly to Section (2)-1, a cache invalidation request via the NUMA network 1000 occurs in two cases. In one case, the cache invalidation request is with respect to data of a partial main storage not connected through the bus. In the other case, the cache invalidation request for data of a bus-connected partial main storage is with respect to a CPU not connected through the bus. In both cases, although the basic operation is the same as in Section (2)-1, the cache invalidation completion packet shown in FIG. 13 may be returned instead of a fetch reply.

When the above operation is executed, the value of the directory entry is reset to 0 in all CPUs, except in the CPU that has issued the cache invalidation request, similarly to Section (1)-2.

(2)-3: Cast-Out Request

Cast-out via the NUMA network 1000 occurs when data is written back into the bus-split partial main storage 180, 280, 380, or 480. In this case, when a write-back request is issued from the CPU 100, 200, 300, or 400 to the NUMA control circuit 120, 220, 320, or 420, output from the request router 600 to the NUMA network 1000 is also selected according to a particular value of the bus setup register 130, 230, 330, or 430. Consequently, the corresponding cast-out request packet is sent to the NUMA network 1000 and written back into the partial main storage 180, 280, 380, or 480 via the directory control circuit 150, 250, 350, or 450. In the present embodiment, as described in Section (1)-3, the data setting of the directory is unchanged during write-back based on cast-out. However, the same also applies to cast-out via the NUMA network 1000.

(3) Bus Connection Change Processing

Irrespective of whether the bus is split or connected, all CPUs having the data block registered in the respective cache memories are registered in the directories 160, 260, 360, and 460 of the directory control circuit 150, 250, 350, or 450, by the operation described in Section (1) or (2). Even after the connection state of the bus has thus been changed, cache coherence control in accordance with the directories 160, 260, 360, and 460 can be realized according to a particular connected or split state of the bus existing after the change. That is, for a set of bus-connected CPUs, control via the bus is anticipated and control via the NUMA network 1000 is not conducted.

Using FIG. 1, this section further describes the operation executed when the bus connection state is changed. For example, when the CPU 100 is to change the connection state of the bus, a request is first transmitted to a service processor 10 through a signal line L10. Next, the service processor stops all CPUs (CPUs 200, 300, 400), except the request source CPU 100, through signal lines L30, L50, and L70. On completion of the stopping operation, the settings of the bus splitting/connecting circuits 500, 510, and 520 are modified and completion of the modifying operation is notified to the CPU 100.

The CPU 100 modifies, into data associated with the bus connection state, the settings of the bus setup registers (A) to (D) and group setup registers (A) to (D) each mapped on an address space as shown in FIG. 8. More specifically, the registers are the bus setup registers 130, 230, 330, and 430, and the group setup registers 170, 270, 370, and 470.

Access to each register is always conducted via the NUMA network 1000, not based on any particular data settings (since the connection state of the bus is likely to change according to data settings). For example, if the CPU 100 is to update the bus setup register 230, the corresponding request is judged to be via the NUMA network in the NUMA control circuit 120, and the bus setup register 230 in the NUMA control circuit 220 is set up via the NUMA network.

As described above, when the settings of the bus setup registers 130, 230, 330, and 430 are modified by the service processor 10, and the settings of the group setup registers 170, 270, 370, and 470, by the CPUs 100, 200, 300, and 400 themselves, the bus splitting/connecting circuits 500, 510, and 520 can modify all settings relating to the split/connected state of the bus. After the modifications, when the operation of all CPUs 100, 200, 300, and 400 is restarted via the service processor 10, correct cache coherence control is subsequently executed according to the new state of the bus.

Embodiment 2

Although Embodiment 1 presupposes the existence of a special NUMA network 1000 for NUMA control, Embodiment 2 described below assumes that packets for the NUMA protocol are also executed via a bus, instead of the NUMA network 1000.

Figure 14:
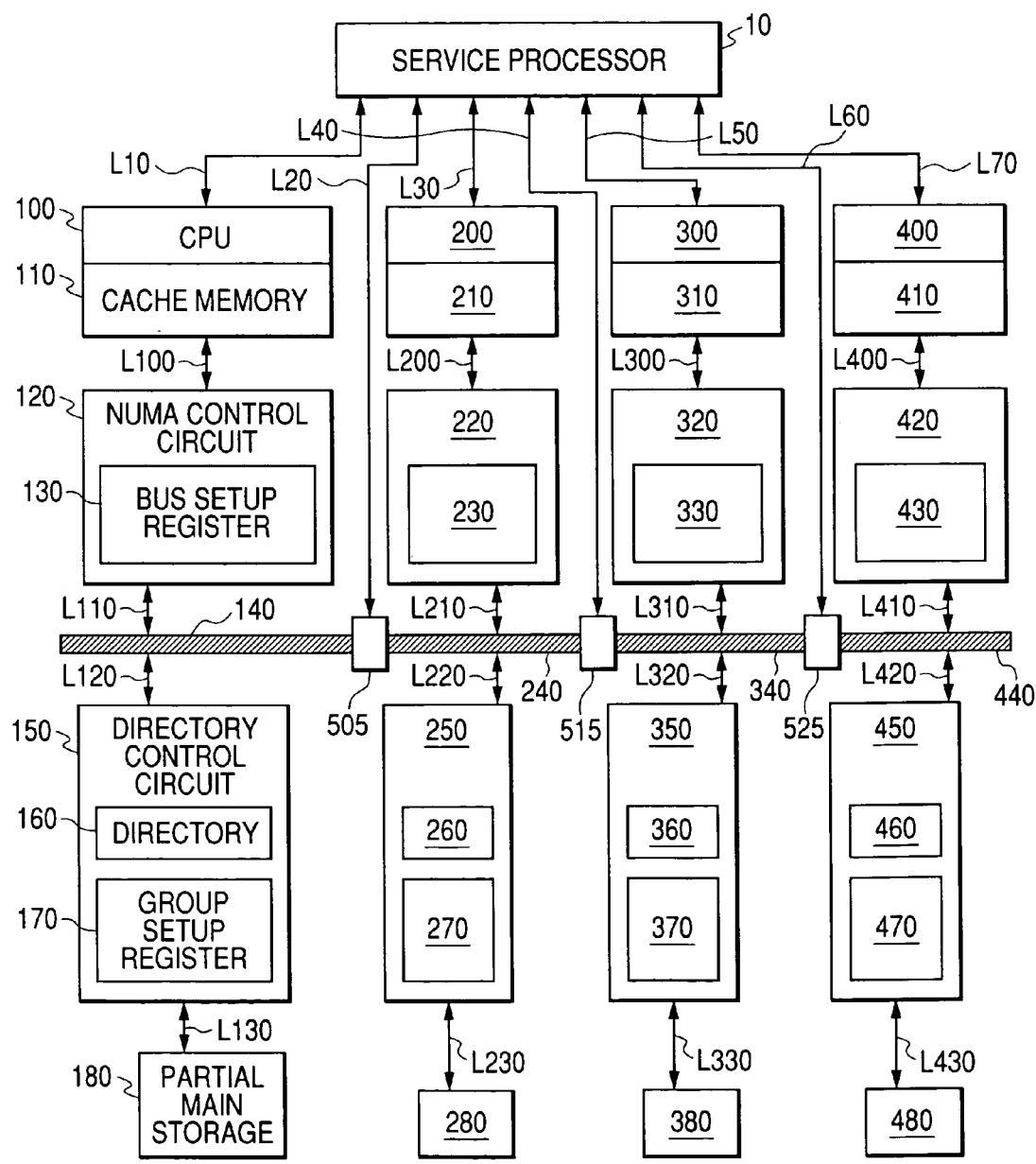
FIG. 14 is a block diagram showing the total configuration of a parallel computer according to Embodiment 2 of the present invention.

A system configuration of Embodiment 2 is shown in FIG. 14. Three differences from the configuration of Embodiment 1 as shown in FIG. 1 exist.

A first difference exists in that the bus splitting/connecting circuits 500, 510, and 520 are substituted by pass filter circuits 505, 515, and 525, respectively. For packets other than NUMA control packets, the pass filter circuits 505, 515, and 525 function similarly to the bus splitting/connecting circuits 500, 510, and 520. In other words, depending on its setting by the service processor 10, each pass filter circuit permits or prohibits passage of a packet. However, packets for NUMA control are always permitted to pass.

A second difference is as follows: in Embodiment 1, a fetch request packet, for example, uses the same command ("0000"), regardless of whether the CPUs are connected through the bus or connected through the NUMA network; wherein the value of the most significant bit in the command is changed to "1" to allow for the likelihood of the pass filter circuits 505, 515, and 525 being unable to distinguish NUMA control packets from other packets. More specifically, although an inter-bus fetch request uses the command "0000", a fetch request packet between NUMA-connected processors uses a command "1000". This change is realized by changing both the request router 600 within the NUMA control circuit 120 and the request generator 710 within the directory control circuit 150.

A third difference exists in that in Embodiment 2, all input/output ports to/from the NUMA network 1000 and to/from the NUMA control circuits 120, 220, 320, and 420 and directory control circuits 150, 250, 350, and 450 that have exchanged NUMA control packets with the NUMA network 1000 in Embodiment 1, are integrated with input/output ports to partial buses 140, 240, 340, 440.

Although this is independent of the above three changes (differences) in configuration, NUMA control packets have been executed at a rate of 1:1 through the NUMA network 1000 in Embodiment 1, whereas, in Embodiment 2, when viewed only in terms of packet transmission, NUMA control packets may be broadcast to all of the partial buses 140, 240, 340, and 440. However, substantive packet processing does not differ from that of Embodiment 1 since the packets actually function at 1:1 according to address and processor ID.

Since NUMA control packets may be broadcast, congestion on the buses is in danger of increasing. It is possible, however, to set partitions appropriate for a particular execution form of a job (e.g., parallel execution of a user JOB by the CPUs 100 and 200). In the example previously described, it is possible set the CPUs 100 and 200 to the same partition so that whereas the partial buses 140 and 240 are completely connected to permit all requests to pass through, the partial buses 240 and 340 are filtered to permit only NUMA control packets to pass through. Thus, the substantive frequency of occurrence of NUMA control packets can be reduced significantly, with the result that a decrease in performance due to NUMA control packet broadcasting does not become a problem.

As described above, when the transmission of packets that has been controlled using the NUMA network 1000 is conducted using the partial buses 140, 240, 340, and 440, it becomes possible, even without network connection between CPUs, to ensure the scalability of performance that characterizes the present invention, and simultaneously to realize a multiprocessor system also having partition setting flexibility.

What is claimed is:

1. A multiprocessor system including a plurality of processors each with a cache memory, and a main storage shared by said plurality of processors, said system comprising:
   means for realizing cache coherence control by broadcasting a cache coherence request to each of said processors via a bus;
   means for setting said bus in a split form so that a broadcasting range in said bus covers a part of said system, not the entirety thereof;
   a directory for recording, in an associated relationship with respect to said main storage, and for each of data blocks of said main storage, an ID of any one of said processors that registered the data block in its cache memory; and
   means for conducting cache coherence control between said processors by using the ID information recorded in said directory;
   wherein cache coherence control based on transmission of the cache coherence request via said bus is conducted between said processors connected by said bus, and
   cache coherence control using said directory is conducted between said processors disconnected from one another by split setting of said bus.

2. The multiprocessor system according to claim 1, wherein, in addition to ID information relating to said processors disconnected by split setting of said bus, ID information relating to said processors connected by said bus is recorded in said directory.

3. The multiprocessor system according to claim 2, wherein, despite the fact that for the ID information of said processors connected by said bus, a cache coherence request in compliance with the ID information is not generated, cache coherence control based on transmission of the cache coherence request via said bus is regarded as having been conducted for the ID information, and maintenance of the ID information, such as cancellation of registration, is implemented.

4. The multiprocessor system according to claim 3, wherein, when said processors originally connected by said bus are disconnected by a change in split setting of said bus during operation, cache coherence control based on transmission of a cache coherence request via said bus is switched to cache coherence control that uses the processor ID information registered in said directory.

5. A multiprocessor system including a plurality of processors each with a cache memory, and a main storage shared by said plurality of processors, said main storage further including a plurality of partial main storages each provided in an associated fashion for each of said plurality of processors or for each of groups thereof, said system comprising:
   means for realizing cache coherence control by broadcasting a cache coherence request to each of said processors via a bus;
   means for setting said bus in a split form so that a broadcasting range in said bus covers a part of said system, not the entirety thereof;
   a directory for recording, for each of data blocks of said partial main storages, an ID of any one of said processors that registered the data block in its cache memory, each of said processors being provided in an associated relationship with respect to each of said partial main storages; and
   means for conducting cache coherence control between said processors by using the ID information recorded in said directory;
   wherein, for cache coherence control with respect to the data contained in said partial main storages present within a range associated with said processors connected to one another by split setting of said bus, when the cache coherence control is to be conducted between said processors connected to one another, the cache coherence control is conducted using said bus, and
   regardless of whether cache coherence control is conducted between said processors disconnected by split setting of said bus, or between said processors connected by said bus, when data to be subjected to the cache coherence control is contained in said partial main storages located outside a range associated with said connected processors, not in said partial main storages located within the range, the cache coherence control is conducted using said directory.

6. The multiprocessor system according to claim 5, wherein, in addition to ID information relating to said processors disconnected by split setting of said bus, ID information relating to said processors connected by said bus is recorded in said directory.

7. The multiprocessor system according to claim 6, wherein, when cache coherence control based on transmission of a cache coherence request via said bus is conducted, the cache coherence control is also regarded as having been conducted for the ID information via said bus, and maintenance of the ID information, such as cancellation of registration, is implemented.

8. The multiprocessor system according to claim 6, wherein, when said bus between said processors originally connected thereby is split by a change in split setting of said bus during operation, cache coherence control based on transmission of a cache coherence request via said bus is switched to cache coherence control that uses the processor ID information registered in said directory.

* * * * *